No. 799,519. PATENTED SEPT. 12, 1905.
W. L. BLISS.
TRAIN LIGHTING SYSTEM.
APPLICATION FILED JULY 20, 1904. RENEWED JULY 17, 1905.
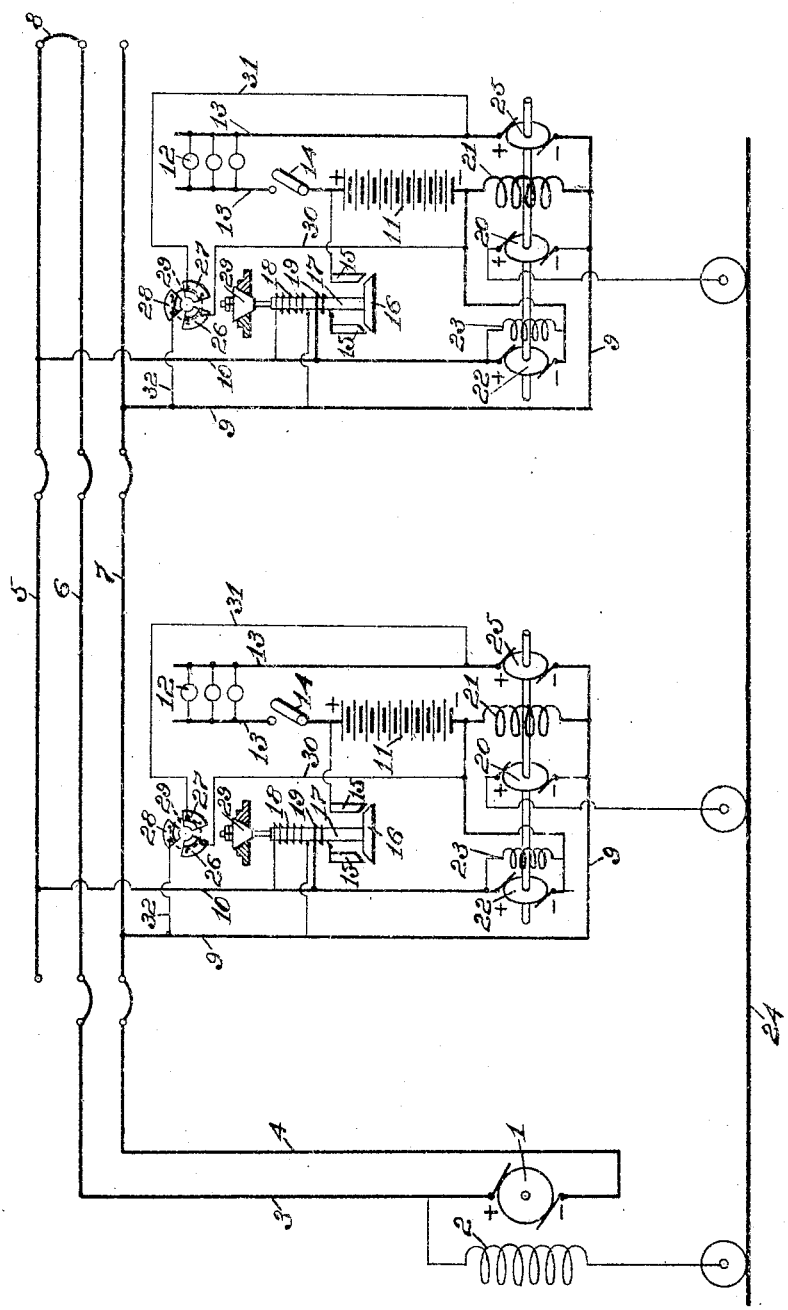
WITNESSES:
Herbert J. Smith
Edwin B. H. Tower, Jr.
INVENTOR
William L. Bliss
BY Jones & Addington
ATTORNEYS

UNITED STATES PATENT OFFICE.

WILLIAM L. BLISS, OF NEW YORK, N. Y., ASSIGNOR TO BLISS ELECTRIC CAR LIGHTING COMPANY, OF MILWAUKEE, WISCONSIN, A CORPORATION OF WISCONSIN.

TRAIN-LIGHTING SYSTEM.

No. 799,519.     Specification of Letters Patent.     Patented Sept. 12, 1905.

Application filed July 20, 1904. Renewed July 17, 1905. Serial No. 270,170.

*To all whom it may concern:*

Be it known that I, WILLIAM L. BLISS, a citizen of the United States, residing at New York, in the county of Kings and State of New York, have invented new and useful Improvements in Train-Lighting Systems, of which the following is a full, clear, concise, and exact description, reference being had to the accompanying drawing, forming a part of this specification.

My invention relates to improvements in systems of electrical distribution, it being especially adapted for lighting a train of cars.

In the lighting of cars by electricity a system has been employed wherein a generator driven by the motion of the car and a storage battery charged by said generator serve as the sources from which current is furnished for operating lamps and other translating devices within the car. When the generator is in certain stages of operation, it supplies current for both charging the storage battery and operating the translating devices, and when it is inoperative, due to the car stopping or running at a low speed, the translating devices are operated by current from the battery. The generator being driven by the motion of the car, it is subjected to wide variations in speed, but the tendency of its voltage to vary to the same extent as its speed is counteracted by varying its field strength inversely as its speed varies through the agency of a suitable automatic regulator. In the lighting of cars with a system of this character it has been the practice to provide each car with a complete lighting system, whereby each car becomes a unit so far as the lighting is concerned, thus necessitating equipping each car with a generator, a storage battery, translating devices, and an automatic regulating mechanism.

The present invention has for its object to provide a system wherein a single generator deriving its power from the motion of the train furnishes the current for all of the cars or units in the train or at least a plurality of said cars or units. As the current which will be necessary for the generator to deliver depends upon the number of cars or units in the train, the generator must be capable of varying its output when the demands for current vary, for otherwise when cars or units are added to the train sufficient current would not be available for all the cars in the train, and when cars or units are taken from the train the current would be excessive for the cars or units which remain. Accordingly in the system of train-lighting of the present invention there is provided a regulator which, while regulating the generator to confine the voltage developed thereby within certain and safe limits, notwithstanding the excessive variations in the speed thereof, does not interfere with the ability of the generator to vary its output when changes are made in the number of cars or units in the train which are to be supplied with current, thus making it possible to have the train composed of any number of cars or units and still have sufficient current for all of the cars.

Another object of the present invention is to provide a train-lighting system in which the generator will deliver to the battery constant current while it operates at constant speed, so that the charging of the battery will be independent of the current consumed by the translating devices.

In accordance with the present invention in its preferred form a generator which derives the power for operating the same from the motion of the train furnishes the current for operating the lamps and other translating devices within the cars or units of the train, a suitable automatic regulator being provided to regulate said generator to confine the voltage developed thereby within certain limits without interfering with the ability of said generator to vary its output when the demands for current vary.

In the preferred form of the present invention the regulator for the generator is in the form of a counter-electromotive-force device, which is adapted to create a counter electromotive force which will oppose the current which tends to flow through the field-magnet of the generator, due to the generator voltage, and reduce the strength of the energizing-current in the field as the speed of the train increases. In this manner the voltage developed by the generator is confined within prearranged limits regardless of changes in the speed of the generator.

A system which will serve to illustrate the principal features of the present invention is illustrated in the accompanying drawing; but while one embodiment of the invention has been selected for the purpose of illustration it will be understood that the invention may be embodied in various other ways.

The system of train-lighting illustrated in the drawing is provided with a generator arranged upon one of the units of the train—as, for instance, the tender of the locomotive—and having an armature 1 and a field 2, said armature being geared to an axle or in any other way arranged so as to derive its motion from the motion of the train. From this generator current is delivered to the supply or generator circuit having mains 3 and 4.

The distribution of the current throughout the train is preferably effected through the agency of a train-line suitably connected between the cars or units of the train and comprising conductors 5, 6, and 7, one of said conductors 6, which serves as an end feeder, being connected at the rear of the train with the conductor 5 through the jumper 8. The train-line receives current from the supply-circuit, the conductors 6 and 7 of the train-line being connected with the supply-mains 3 and 4, and distributes it from the conductors 5 and 7 into the cars. As the current in reaching each car through the train-line must be transmitted the same distance, equal voltages are impressed upon each car.

In further describing the preferred embodiment of the present invention reference will be made to one car only, as the equipment in each car is preferably the same. From the conductors 5 and 7 of the train-line extend car-mains 9 and 10, which supply current to the storage battery 11 and the translating devices 12—such as lamps, fan-motors, and other electrical appliances—said translating devices preferably being connected in the translating-circuit 13 13, which may be controlled by a switch 14. The car-circuit is preferably controlled by an automatic switch, which may consist of stationary contacts 15 15 and a movable contact 16, carried by a plunger 17, said plunger being operated by a solenoid 18 of fine wire connected in a shunt between the supply-mains 9 and 10. When the automatic switch is closed, a solenoid 19 of coarse wire connected in series with the switch-contacts assists the shunt-solenoid in effecting closer engagement between the switch-contacts for increasing current flowing through the switch from the generator. The automatic switch is closed by the shunt-solenoid when the generator in starting develops a certain voltage, and then, the switch being closed, the series solenoid 19 becomes energized. As long as the generator voltage remains in excess of the battery voltage the series solenoid is energized by current from the generator, and then the two solenoids act conjointly in keeping the switch closed; but when the generator voltage falls below the battery voltage the series solenoid becomes energized by current from the battery flowing backward therethrough, and then as the two solenoids oppose each other, due to the reversal of the polarity of the series solenoid, the switch opens and stops the discharge of the battery through the generator.

The generator is preferably regulated to confine the voltage developed thereby within safe limits irrespective of its variations in speed by a counter-electromotive-force device having an armature 20 and a field or controlling magnet 21, said armature preferably being driven in starting by a shunt-wound motor having an armature 22 and a field 23. The armature of the counter-electromotive-force device is preferably connected in series with the shunt-field 2 of the generator, while the field or controlling magnet thereof is preferably connected in the battery-circuit in series with the battery. The connection of the armature 20 of the counter-electromotive-force device with the field 2 of the generator is preferably effected through the conducting-frame of the car and the track 24. The motor is preferably connected between the supply-main 3 and the battery-circuit, said motor being connected with the battery-circuit at a point between the battery and the controlling-magnet 21, so as to place said motor and magnet in series, and thus produce a certain effect which shall be hereinafter explained.

When the generator delivers current to the battery, the field or controlling magnet 21 of the counter-electromotive-force device becomes excited, and then the armature 20 thereof, which runs at substantially constant speed, creates a counter electromotive force in the field-circuit of the generator in opposition to the current which tends to flow through the generator-field due to the generator voltage. When variations in the voltage developed by the generator occur, the current flowing through the battery-circuit varies, and hence the strength of the field or controlling magnet of the counter-electromotive-force device varies. As this results in variations in the counter electromotive force introduced into the field-circuit of the generator to oppose the current tending to flow through the generator-field, the energizing-current for the generator-field varies. Thus the field strength of the generator varies in almost exact accordance with the variations in the speed of the generator, and as the field strength of the generator varies in approximately inverse proportion to variations in the speed of the generator the voltage developed by the generator remains within certain and safe limits, notwithstanding the extent to which the speed of the generator may rise.

The armatures of the counter-electromotive-force devices upon the several cars being in parallel with each other, the combined voltage of all the said counter-electromotive-force devices will be substantially the same as the individual voltages of said devices, and hence the voltage of any number of said devices will be the same as that of any other number of said devices, whether it be greater or less. Thus the effect of combining or grouping the voltages of the counter-electromotive-force devices upon the field of the generator will be the same as the effect of the individual voltage of one of said devices, as the internal resistance of the armatures of said counter-electromotive-force devices is low as compared with the generator-field, and consequently said counter-electromotive-force devices will act in unison in controlling the generator and will not interfere with the action of each other. Although it is usually preferable to have a regulator upon each car, it is not necessary to have more than one regulator in a train to properly regulate the generator.

As each counter electromotive force has the field or controlling magnets thereof connected in the battery branch of the local circuit upon the car therewith, the counter-electromotive-force devices will regulate the generator to confine the voltage developed thereby within prearranged limits without interfering with the ability of the generator to vary the output thereof upon variations in the demands for current. Consequently when the demand for current by the translating devices increases the output of the generator will increase, so that the current received by the batteries will remain substantially unaffected—that is, assuming that the total output of the generator for the two cars indicated in the drawing is seventy amperes, thirty-five amperes for each car, and that the translating devices in each car are consuming twenty amperes, thus leaving fifteen amperes for the battery, then if the current consumed by the translating devices should increase to thirty-five amperes, the total output of the generator would increase to one hundred amperes, so that instead of thirty-five amperes fifty amperes would be supplied to each car, thirty-five amperes for the translating devices and fifteen amperes for the battery. Moreover, when cars are added to the train the output of the generator will increase, and when cars are taken from the train the output of the generator will decrease—that is, assuming that the train is composed of five cars and that the generator output is two hundred and fifty amperes, fifty amperes for each car, then if a car be added to the train the output of the generator would increase to three hundred amperes, and if a car be taken from the train the output of the generator would decrease to two hundred amperes. Hence it is possible to have the train composed of any number of cars and still have the generator output suitable for the entire train.

An advantage which arises from having the charging of the battery independent of the current consumed by the translating devices is that where the train runs upon a certain schedule it is possible to insure sufficient current being delivered by the generator to the battery to compensate for all the demands which may be made upon the battery by the translating devices, and thus prevent the battery from becoming depleted during the trips of the train.

Continuing with the description of the lighting system in one of the cars, the counter-electromotive-force device is preferably provided with a second armature 25, which is connected in the translating-circuit 13 13 and driven by the same motor in starting and excited by the same field as the armature 20. When the field or controlling magnet 21 is excited, a counter electromotive force is introduced into the translating-circuit by the armature 25 to oppose the voltage impressed upon said circuit by the generator, said counter electromotive force being in proportion to the current flowing through said magnet. As said counter electromotive force increases in proportion to the rise in the electromotive force at the terminals of the battery when the battery is being charged, it always equals the excess electromotive force which is necessary to charge the battery. As a result of this the voltage impressed upon the translating devices remains constant irrespective of the rise in voltage at the terminals of the battery coincident with the charging of the battery and independent of the number of translating devices in operation.

After the motor serves the purpose of starting the counter-electromotive-force device and the counter-electromotive-force device becomes operative the motor is then relieved of its load, as the electrical energy received or absorbed by said device from the translating-circuit and also from the field-circuit of the generator tends to operate said device. At this stage in the operation of said device and said motor the motor becomes a generator, while the counter-electromotive-force device becomes a motor, and under such conditions a large portion of the energy consumed in operating said device is restored to the system by the motor which acts as a generator and is operated by said device.

The counter-electromotive-force device is preferably rendered inoperative when the automatic switch is open through the agency of a short-circuiting switch, which may consist of a segmental socket having segments 26, 27, and 28 and a plug 29, adapted to sit within said socket and connect said segments, said plug being mounted upon the plunger 17 of the automatic switch. The segment 26 is connected, through conductor 30, with one side of the field or controlling magnet 21, while the segment 27 is connected with one side of the armature 25 by the conductor 31, the segment 28 being connected with the opposite side of said magnet and said armature through conductor 32 and car-main 9. The short-circuiting switch is closed when the automatic switch is open, and then the counter-electromotive-force device is rendered inoperative, the field or controlling magnet 21 and the armature 25 thereof being completely short-circuited. Under these conditions the circuit from the battery is completed through the translating-circuit from one terminal of the battery through switch 14, conductor 13, translating devices 12, conductors 13 and 31, segment 27, plug 29, segment 26, and conductor 30 to the other terminal of the battery. When the automatic switch is closed, the short-circuiting switch is open, and then the counter-electromotive-force device is operative.

When the battery is furnishing a part of the current for operating the translating devices and the generator is also operative, the automatic switch being closed and the short-circuiting switch open; current from the battery tends to flow through the field or controlling magnet 21 of the counter-electromotive-force device and excite said magnet with such polarity that the counter-electromotive-force device tends to become a direct-electromotive-force device and increase the current flowing through the field-circuit of the generator and also through the translating-circuit. At the same time, however, current from the generator flowing through the motor also tends to flow through said magnet in the opposite direction to the current from the battery. As these currents cannot flow through the same path in opposite directions simultaneously, the result is that only the excess of one current over the other will flow through the magnet, and in the event of said currents being equally balanced the magnet will be absolutely inert. The current which the generator tends to send through the magnet will depend upon the load on the motor, and consequently the more heavily the counter-electromotive-force device becomes loaded in its effort to create a direct electromotive force the greater will be the current which the generator will tend to send through the field or controlling magnet. As the load upon the motor will be proportional to the current which the battery sends through the armature 25, when the current from the battery tends to increase an equivalent increase will occur in the current from the generator, and hence the equilibrium between the opposing currents will remain substantially undisturbed. Since substantially no current will flow through the field or controlling magnet when the generator and battery are tending to send current therethrough in opposite directions, the magnet will be substantially inert, and consequently the counter-electromotive-force device will be inoperative, even though the armatures thereof are being driven by the motor. During the existence of these conditions current from the battery will flow from the positive terminal of the battery through the switch 14, conductor 13, translating devices 12, conductor 13, armature 25, car-main 9, supply-main 4, armature 1, supply-main 3, conductors 6 and 5 of the train-line, car-main 10, and the motor to the negative terminal of the battery, and also current from the generator will flow from the positive terminal of the generator through supply-main 3, conductors 6 and 5 of the train-line, car-main 10, motor-armature 22 and field 23, the battery 11, switch 14, conductor 13, translating devices 12, conductor 13, armature 25, car-main 9, and supply-main 4 to the negative terminal of the generator. Thus the current from the generator and the current from the storage battery flow in series through the same circuit, and although the field or controlling magnet forms a conducting-path from one side of this circuit to the other current is excluded from flowing across the same, due to the opposing current having approximately eliminated the difference in potential at the terminals of the magnet.

In the operation of the system if the train is at rest and it is desired to light the lamps the switch 14 may be closed to complete the translating-circuit, and then current will flow from the battery through the lamps. If the train is in motion, the generator will develop a voltage which will be impressed upon the supply-mains 3 and 4 and through the train-line to the car-mains 9 and 10, and then if the train is running at sufficient speed the generator will supply the current necessary to operate the translating devices, and the battery will cease discharging.

Assuming that when the train runs at about twenty miles per hour the generator runs at five hundred revolutions per minute and develops sixty-four volts. Then when the train runs at about sixty miles per hour the generator would run at about fifteen hundred revolutions per minute, and then if all other conditions remained the same it would develop about one hundred and ninety-two volts; but when it operates at the latter speed the field thereof is weakened by the counter-electromotive-force device to such an extent that the voltage remains within safe limits. It is sufficient to have the generator develop eighty volts at the maximum speed of the train, as this would be approximately two and one-half volts per cell, which is ample to force the full charging-current through the battery, provided the battery contains thirty-two cells having a normal voltage of sixty-four volts. Accordingly the generator is preferably regulated by the counter-electromotive-force device to allow a variation in the voltage developed by the generator from about sixty-four to eighty volts, while the speed of the generator varies from about five hundred revolutions per minute at a train speed of twenty miles per hour to fifteen hundred revolutions per minute at a train speed of about sixty miles per hour.

Upon starting the train the automatic switch closes when the generator develops, for instance, sixty-four volts and completes the circuit from the generator through supply-main 3, conductors 6 and 5 of the train-line, car-main 10, switch-contacts 15 16 15, thence through switch 14, conductor 13, translating devices 12, conductor 13, armature 25, and also battery 11 and controlling-magnet 21 and back to the generator by car-main 9, conductor 7, and supply-main 4. While the voltage developed by the generator and that of the storage battery remain substantially equal, the generator and the battery will coöperate in supplying current to the translating devices. When the generator develops more than sixty-four volts, which is the normal battery voltage, current will be supplied to the storage battery as well as to the translating devices. The rise in the generator voltage coincident with charging the batteries, however, does not affect the voltage impressed upon the lamps, as the counter-electromotive-force device serves to maintain constant voltage upon the translating devices.

It is manifest that many changes may be made in the system illustrated in this application for the purpose of explaining the invention which will not in any way depart from the invention as it is defined in the claims of this specification.

Having thus described my invention, what I claim as new, and desire to secure by Letters Patent, is—

1. In a train-lighting system, in combination, a generator receiving the power for operating the same from the motion of the train, a local circuit located upon each of a plurality of units of the train, said local circuits being connected to said generator in parallel with each other, a storage battery and translating devices connected to each local circuit in parallel with each other, and an automatic regulator operatively connected in circuit with said generator to confine the voltage developed thereby within prearranged limits without interfering with the ability of the generator to vary the output thereof according to the demands for current, said regulator being located upon a different unit of the train from said generator.

2. In a train-lighting system, in combination, a generator receiving the power for operating the same from the motion of the train, a local circuit located upon each of a plurality of units of the train, said local circuits being connected to said generator in parallel with each other, a storage battery and translating devices connected to each local circuit in parallel with each other, and an automatic regulator carried upon each of said plurality of units of the train and operatively connected in circuit with said generator to confine the voltage developed thereby within prearranged limits without interfering with the ability of the generator to vary the output thereof according to the demands for current.

3. In a train-lighting system, in combination, a generator receiving the power for operating the same from the motion of the train, a local circuit located upon each of a plurality of units of the train, said local circuits being connected to said generator in parallel with each other, a storage battery and translating devices connected to each local circuit in parallel with each other, and an automatic regulator carried upon each of said plurality of units of the train and operatively connected in circuit with said generator to confine the voltage developed thereby within prearranged limits without interfering with the ability of the generator to vary the output thereof according to demands for current, said regulators being connected in circuit in parallel with each other.

4. In a train-lighting system, in combination, a generator receiving the power for operating the same from the motion of the train, a local circuit located upon a unit of the train, a storage battery and translating devices connected to said local circuit in parallel with each other, an automatic regulator regulating said generator and having an electromagnet controlling the operation thereof, said electromagnet being connected in the battery branch of said local circuit, and another local circuit having a battery and translating devices connected thereto and located upon another unit of the train, said local circuits being connected to the generator in parallel with each other.

5. In a train-lighting system, in combination, a generator receiving the power for operating the same from the motion of the train, said generator being provided with a regulating-circuit, a local circuit located upon a unit of the train, a storage battery and translating devices connected to said local circuit, a dynamo-electric machine automatically regulating said generator to confine the output thereof within prearranged limits, the armature of said dynamo-electric machine being connected in said regulating-circuit and the field thereof being connected in the battery branch of said local circuit, and another local circuit having a battery and translating devices connected thereto and located upon another unit of the train, said local circuits being connected to said generator in parallel with each other.

6. In a train-lighting system, in combination, a generator receiving the power for operating the same from the motion of the train and having a regulating-circuit, a local circuit located upon a unit of the train, a storage battery and translating devices connected to said local circuit in parallel with each other, a dynamo-electric machine having an armature connected in said regulating-circuit to introduce a counter electromotive force therein and a field connected in the battery branch of said local circuit, and another local circuit having a storage battery and translating devices connected thereto and located upon another unit of the train, said local circuits being connected to said generator in parallel with each other.

7. In a train-lighting system, in combination, a generator receiving the power for operating the same from the motion of the train, a local circuit located upon each of a plurality of units of the train, said local circuits being connected to said generator in parallel with each other, a storage battery and translating devices connected to each local circuit in parallel with each other, and an automatic regulator carried upon each of said plurality of units of the train and regulating said generator to confine the output thereof within prearranged limits, each regulator being provided with an electromagnet controlling the operation thereof and connected in the battery branch of the local circuit upon the unit of the train therewith.

8. In a train-lighting system, in combination, a generator receiving the power for operating the same from the motion of the train, a local circuit located upon each of a plurality of units of the train, said local circuits being connected in parallel with each other, a storage battery and translating devices connected to each local circuit in parallel with each other, and an automatic regulator carried upon each of said plurality of units of the train and regulating said generator to confine the output thereof within prearranged limits, each regulator being provided with an electromagnet controlling the operation thereof and connected in the battery branch of the local circuit upon the unit of the train therewith, said regulators being connected in circuit in parallel with each other.

9. In a train-lighting system, in combination, a generator receiving the power for operating the same from the motion of the train, a local circuit located upon each of a plurality of units of the train, said local circuits being connected to said generator in parallel with each other, a storage battery and translating devices connected to each local circuit in parallel with each other, and a dynamo-electric machine carried upon each of said plurality of units of the train and regulating said generator to confine the output thereof within prearranged limits, each dynamo-electric machine having the field thereof connected in the battery branch of the local circuit upon the unit of the train therewith.

10. In a train-lighting system, in combination, a generator receiving the power for operating the same from the motion of the train, a local circuit located upon each of a plurality of units of the train, said local circuits being connected to said generator in parallel with each other, a storage battery and translating devices connected to each local circuit in parallel with each other, and a dynamo-electric machine carried upon each of said plurality of units of the train and regulating said generator to confine the output thereof within prearranged limits, each dynamo-electric machine having the field thereof connected in the battery branch of the local circuit upon the unit of the train therewith, the armatures of said dynamo-electric machine being connected in parallel with each other.

11. In a train-lighting system, in combination, a generator receiving the power for operating the same from the motion of the train, a local circuit located upon a unit of the train, a storage battery and translating devices connected to said local circuit in parallel with each other, an automatic regulator regulating said generator and having an electromagnet controlling the operation thereof, said magnet being connected in the battery branch of said local circuit, and another local circuit having a battery and translating devices connected thereto in parallel with each other and located upon another unit of the train, said local circuits being connected to the generator in parallel with each other, and means rendering said regulator inoperative when the batteries discharge current.

12. In a train-lighting system, in combination, a generator receiving the power for operating the same from the motion of the train, a local circuit located upon each of a plurality of units of the train, a storage battery and translating devices connected to each local circuit in parallel with each other, an automatic regulator carried upon each unit of the train and regulating said generator, each regulator being provided with an electromagnet controlling the operation thereof and connected in the battery branch of the local circuit upon the unit of the train therewith, and means rendering said regulators inoperative when the batteries discharge current.

13. In a train-lighting system, in combination, a generator receiving the power for operating the same from the motion of the train, said generator being provided with a regulating-circuit, a local circuit located upon a unit of the train, a storage battery and translating devices connected to said local circuit, a dynamo-electric machine automatically regulating said generator, said dynamo-electric machine being provided with an armature connected in said regulating-circuit and a field connected in the battery branch of said local circuit, another local circuit having a battery and translating devices connected thereto and located upon another unit of the train, said local circuits being connected to said generator in parallel with each other, and means rendering said dynamo-electric machines inoperative when the batteries discharge current.

14. In a train-lighting system, in combination, a generator receiving the power for operating the same from the motion of the train, said generator being provided with a regulating-circuit, a local circuit located upon each of a plurality of units of the train, said local circuits being connected to said generator in parallel with each other, a storage battery and translating devices connected to each local circuit in parallel with each other, a dynamo-electric machine carried upon each of said plurality of units of the train, and automatically regulating said generator, each dynamo-electric machine having the field thereof connected in the battery branch of the local circuit upon the unit of the train therewith, the armatures of said dynamo-electric machines being connected in said regulating-circuit in parallel with each other, and means rendering said dynamo-electric machines inoperative when the batteries discharge current.

15. In a train-lighting system, in combination, a generator, a local circuit located upon each of a plurality of units of the train, said local circuits being connected to said generator in parallel with each other, a storage battery and translating devices connected to each local circuit in parallel with each other, and means regulating the output of said generator, and a regulator carried upon each of said plurality of units of the train and regulating the voltage impressed upon said translating devices, each regulator being provided with an electromagnet controlling the operation thereof and connected in the battery branch of the local circuit upon the unit of the train therewith.

16. In a train-lighting system, in combination, a generator, a local circuit located upon each of a plurality of units of the train, said local circuits being connected to said generator in parallel with each other, a storage battery and translating devices connected to each local circuit in parallel with each other, a regulator carried upon each of said plurality of units of the train and regulating the voltage impressed upon said translating devices, each regulator being provided with an electromagnet controlling the operation thereof and connected in the battery branch of the local circuit upon the unit of the train therewith, and means rendering said regulators inoperative when the batteries discharge current.

17. In a train-lighting system, in combination, a generator, a local circuit located upon each of a plurality of units of the train, said local circuits being connected to said generator in parallel with each other, a storage battery and translating devices connected to each local circuit in parallel with each other, and a dynamo-electric machine carried by each of said plurality of units of the train and regulating the voltage impressed upon said translating devices, each dynamo-electric machine having the field thereof connected in the battery branch of the local circuit upon the unit of the train therewith.

18. In a train-lighting system, in combination, a generator, a local circuit located upon each of a plurality of units of the train, said local circuits being connected to said generator in parallel with each other, a storage battery and translating devices connected to each local circuit in parallel with each other, and a dynamo-electric machine carried by each of said plurality of units of the train and regulating the voltage impressed upon said translating devices, each dynamo-electric machine having the field thereof connected in the battery branch of the local circuit upon the unit of the train therewith, and means rendering said dynamo-electric machines inoperative when the batteries discharge current.

19. In a train-lighting system, in combination, a generator, a local circuit located upon each of a plurality of units of the train, said local circuits being connected to said generator in parallel with each other, a storage battery and translating devices connected to each local circuit in parallel with each other, and a dynamo-electric machine having an armature connected in the translating branch of the local circuit upon the unit of the train therewith to introduce a counter electromotive force therein to regulate the voltage impressed upon the translating devices, each dynamo-electric machine having the field thereof connected in the battery branch of the local circuit upon the unit of the train therewith.

20. In a train-lighting system, in combination, a generator receiving the power for operating the same from the motion of the train and having a regulating-circuit, a local circuit located upon each of a plurality of units of the train, said local circuits being connected to said generator in parallel with each other, a storage battery and translating devices connected to each local circuit in parallel with each other, and a dynamo-electric machine carried upon each of said plurality of units of the train and regulating the generator to confine the output thereof within prearranged limits, and also regulating the voltage impressed upon the translating devices upon the unit of the train therewith, each dynamo-electric machine having the field thereof connected in the battery branch of the local circuit upon the unit of the train therewith.

21. In a train-lighting system, in combination, a generator receiving the power for operating the same from the motion of the train and having a regulating-circuit, a train-circuit receiving current from said generator, a local circuit located upon each of a plurality of units of the train, said local circuits being connected to said train-circuit in parallel with each other, a storage battery and translating devices connected to each local circuit in parallel with each other, and a dynamo-electric machine having an armature connected in said regulating-circuit to introduce a counter electromotive force therein to regulate the generator and another armature connected in the translating branch of the local circuit upon the unit of the train therewith to introduce a counter electromotive force therein to regulate the voltage impressed upon the translating devices, each dynamo-electric machine having the field thereof connected in the battery branch of the local circuit upon the unit of the train therewith.

22. In a train-lighting system, in combination, a generator receiving the power for operating the same from the motion of the train, a train-circuit extending through a plurality of units of the train, a local circuit located upon each of said plurality of units of the train, said local circuits being connected to said train-circuit in parallel with each other, a storage battery and translating devices connected to each local circuit in parallel with each other, and a regulator carried upon each of said plurality of units of the train and operatively connected in circuit with said generator to confine the output thereof within prearranged limits, each regulator being provided with an electromagnet controlling the operation thereof and connected in the battery branch of the local circuit upon the unit of the train therewith, said regulators being connected in circuit in parallel with each other, and another regulator carried upon each of said plurality of units of the train and regulating the voltage impressed upon said translating devices, each latter regulator being provided with a magnet controlling the operation thereof and connected in the battery branch of the local circuit upon the unit of the train therewith.

23. In a train-lighting system, in combination, a generator receiving the power for operating the same from the motion of the train, a train-circuit extending through a plurality of units of the train, a local circuit located upon each of said plurality of units of the train, said local circuits being connected to said train-circuit in parallel with each other, a storage battery and translating devices connected to each local circuit in parallel with each other and a regulator carried upon each of said plurality of units of the train and operatively connected in circuit with said generator to confine the output thereof within prearranged limits, each regulator being provided with an electromagnet controlling the operation thereof and connected in the battery branch of the local circuit upon the unit of the train therewith, said regulators being connected in circuit in parallel with each other, and another regulator carried upon each of said plurality of units of the train, and regulating the voltage impressed upon said translating devices, each latter regulator being provided with a magnet controlling the operation thereof and connected in the battery branch of the local circuit upon the unit of the train therewith, and means rendering said regulators inoperative when the batteries discharge current.

24. In a train-lighting system, in combination, a generator receiving the power for operating the same from the motion of the train and having a regulating-circuit, a train-circuit extending through a plurality of units of the train and receiving current from said generator, a local circuit located upon each of said plurality of units of the train, said local circuits being connected to said train-circuit in parallel with each other, a storage battery and translating devices connected to each local circuit in parallel with each other, a dynamo-electric machine carried by each of said plurality of units of the train and having the field thereof connected in the battery branch of the local circuit upon the unit of the train therewith, said dynamo-electric machine having the armatures thereof connected in said regulating-circuit in parallel with each other to regulate the generator, another dynamo-electric machine carried by each of said plurality of units of the train and having the field thereof connected in the battery branch of the local circuit upon the unit of the train therewith, each latter dynamo-electric machine having the armature thereof connected in the translating branch of the local circuit upon the unit of the train therewith to regulate the voltage impressed upon said translating devices.

25. In a train-lighting system, in combination, a generator receiving the power for operating the same from the motion of the train and having a regulating-circuit, a train-circuit extending through a plurality of units of the train and receiving current from said generator, a local circuit located upon each of said plurality of units of the train, said local circuits being connected to said train-circuit in parallel with each other, a storage battery and translating devices connected to each local circuit in parallel with each other, a dynamo-electric machine carried by each of said plurality of units of the train and having the field thereof connected in the battery branch of the local circuit upon the unit of the train therewith, said dynamo-electric machines having the armatures thereof connected in said regulating-circuit in parallel with each other to regulate the generator, another dynamo-electric machine carried by each of said plurality of units of the train and having the field thereof connected in the battery branch of the local circuit upon the unit of the train therewith, each latter dynamo-electric machine having the armature thereof connected in the translating branch of the local circuit upon the unit of the train therewith to regulate the voltage impressed upon said translating devices, and means rendering said dynamo-electric machines inoperative when the batteries discharge current.

In witness whereof I have hereunto subscribed my name in the presence of two witnesses.

WILLIAM L. BLISS.

Witnesses:
EDWIN B. H. TOWER, Jr.,
J. N. ROBERTSON.